Jan. 22, 1957 W. H. HOWE ET AL 2,778,990
HYDROGEN ION CONCENTRATION MEASURING APPARATUS
Filed April 13, 1953 2 Sheets-Sheet 1

Fig. 1.

INVENTORS
Wilfred H. Howe
Leon G. S. Wood
BY Curtis, Morris + Safford
ATTORNEYS

Jan. 22, 1957 W. H. HOWE ET AL. 2,778,990
HYDROGEN ION CONCENTRATION MEASURING APPARATUS
Filed April 13, 1953 2 Sheets-Sheet 2

INVENTORS
Wilfred H. Howe
Leon G. S. Wood
BY Curtis, Morris + Safford
ATTORNEYS

United States Patent Office 2,778,990
Patented Jan. 22, 1957

2,778,990

HYDROGEN ION CONCENTRATION MEASURING APPARATUS

Wilfred H. Howe, Sharon, and Leon G. S. Wood, Wollaston, Mass., assignors to The Foxboro Company, Foxboro, Mass., a corporation of Massachusetts Application April 13, 1953, Serial No. 348,498

34 Claims. (Cl. 324—30)

This invention relates to pH or hydrogen ion concentration measuring systems, and more particularly to a system for automatically and continuously providing an electrical signal that is a function of the pH of a solution under test.

As is well known, pH is a symbol that refers to the concentration of hydrogen ions present in a liquid or solution. The relationship is a logarithmic one; that is, pH is approximately the negative logarithm, to the base 10, of the concentration of hydrogen ions per liter. The hydrogen ion concentration of pure water, for example, is equal to $10^{-7}$ gram equivalent per liter at 22° C., so that water is assigned a pH valve of 7 on this scale. The scale typically extends from zero, for relatively strong acids, to 14 for relatively strong bases, and covers for all practical purposes the useful range of inquiry.

While the concentration of hydrogen ions has significance because of its effect on certain chemical reactions, the real importance of pH resides in its service as an index of reactions not specifically involving the hydrogen ion. Control of pH is a valuable method of controlling a large number of industrial processes, such as petroleum processing, sugar refining, fermentation, etc. Apparatus capable of providing a continuous and precise measurement of pH is, therefore, of considerable economic value, particularly if it is suitable for use with automatic, unattended control equipment.

It is generally considered that the electrochemical method of pH measurement provides more accuracy and is otherwise more suitable for most industrial purposes than other methods, such as color comparison of pH indicators. In the electrochemical method, pH is determined by measuring the potential developed by an electric cell composed of electrodes immersed in the test solution. Although many different types of electrodes (or "half cells" as they are referred to in the literature) have been devised for this purpose, each having characteristics suitable for certain specific applications, there are several outstanding problems which have limited the usefulness of the electrodes now generally available, particularly in industrial applications.

One problem results from the extremely high internal resistance of such electrodes. For example, one commonly used type of electrode, known as the "glass electrode," has an internal resistance of the order of a thousand meghoms when it is constructed of sufficient thickness to reduce fragility and permit its use in a flowing solution. This characteristic precludes a current drain of much above $10^{-12}$ amperes. And when such a pH "measurement" electrode is employed in conjunction with ordinary amplification and detection equipment, instability and appreciable errors due to electrical leakage and extraneous parallel electromotive forces will normally result. The problem is particularly acute when it is desired to measure the pH of a liquid that is flowing through a grounded electrically conductive pipe (such as is found in many industrial processes), since in such apparatus the possibility of unwanted circulating current paths is greatly increased.

A glass electrode, when immersed in a solution, will generate across its glass membrane a potential difference that is a function of the hydrogen ion concentration in the solution under test. But in order to measure this potential, it is necessary to make electrical connections both to the electrode and to the solution, and to permit the flow of a small current. It is not ordinarily satisfactory to make the required connection with the liquid or solution under test by means of the usual metallic contact electrode, since such an electrode produces at its junction with the solution under test a potential which varies with the composition of such solution.

For some purposes, the connection to the solution can satisfactorily be made through a "reference" half cell, such as the so-called "calomel" cell. A "measurement" half cell (such as a quinhydrone electrode) produces a potential which is essentially linearly related to variations in hydrogen ion concentration, whereas a reference half cell is specially designed to produce a potential which is substantially non-responsive to variations in hydrogen ion concentration. The total cell potential across the half cell terminals can, therefore, readily be calibrated in terms of solution pH. With this arrangement, however, there is still a problem of leakage and instability during measurement, since the half cells are in contact with a conducting liquid which generally will have unwanted electrical return paths to the measuring equipment, such as through the test solution vessel, etc. The ordinarily high impedance of such return paths does not provide the usual safeguard, because of the extremely high internal resistance of the measurement and reference half cells.

Another problem, which appears to be inherent in electrochemical cell measurements of pH, is temperature sensitivity. The potential produced by a cell at a given pH varies with temperature, and the variation thus introduced changes the relation between voltage and hydrogen ion concentration. In addition, for many types of cells, a change in temperature will shift the zero voltage intercept; that is, the pH at which the total cell output voltage becomes zero may be a function of temperature. Therefore, for continuous and unattended measurement of pH, it is necessary to provide correction equipment which is capable of both compensating for changes in the characteristic output slope and also capable of properly shifting the zero voltage intercept in accordance with fluctuations in the temperature of the test solution.

Accordingly, it is an object of this invention to provide solutions for the above and other problems, and to provide apparatus which is capable of accurately and continuously measuring the pH of a solution, whether the solution is a small sample or whether it is flowing through a conduit or electrically conductive pipe as part of an industrial process. The details of one embodiment of the invention will be described more fully hereinafter; in general, however, this embodiment includes the use of a third electrode for making contact with the solution, a novel three-connection arrangement for comparing potentials whereby all potentials except those responsive to pH are substantially balanced out, and stable amplification means to produce a usable signal for driving a load such as a controller.

These and other objects and advantages will be in part obvious from and in part pointed out in the following specification taken together with the accompanying drawings where.

Figure 1:
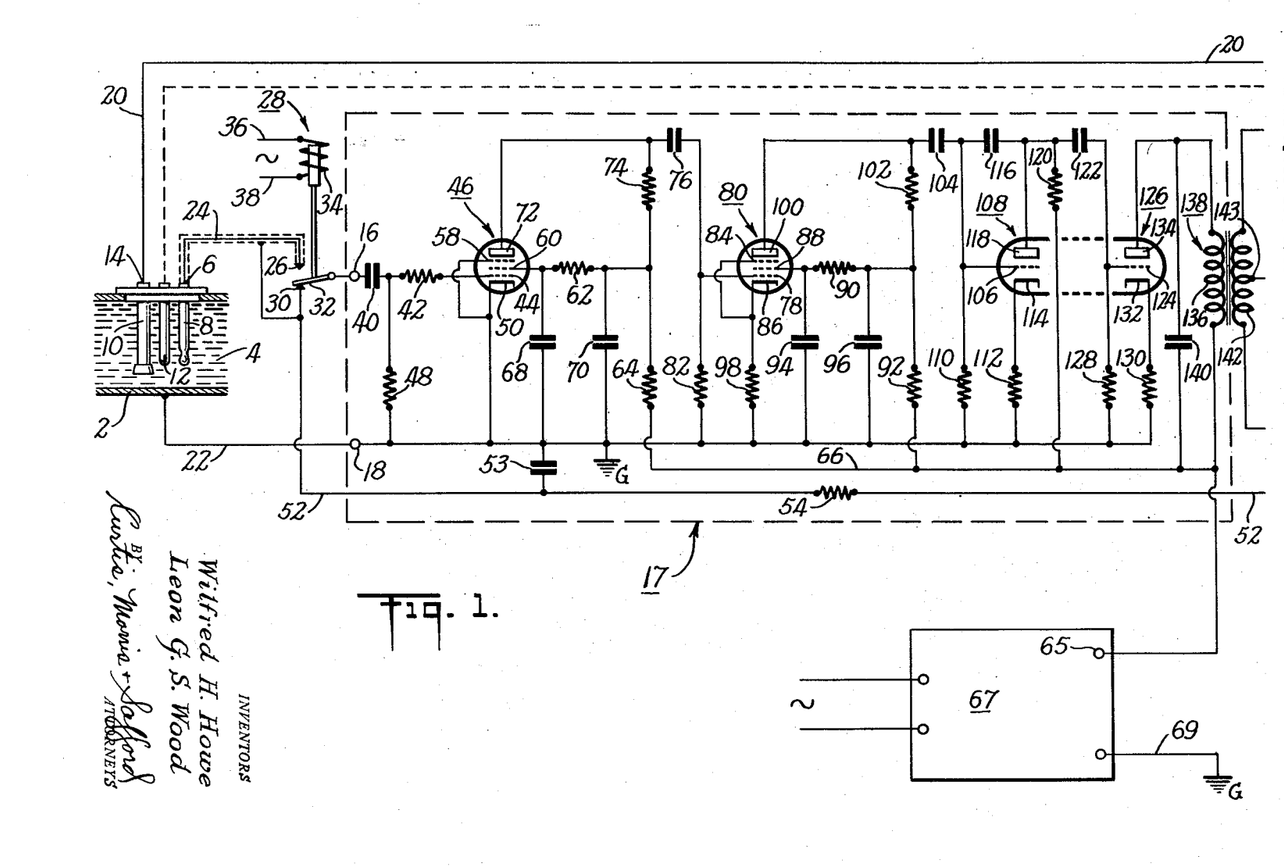
Figures 1 and 1a show a schematic diagram of one embodiment of the invention.
Figure 1A:
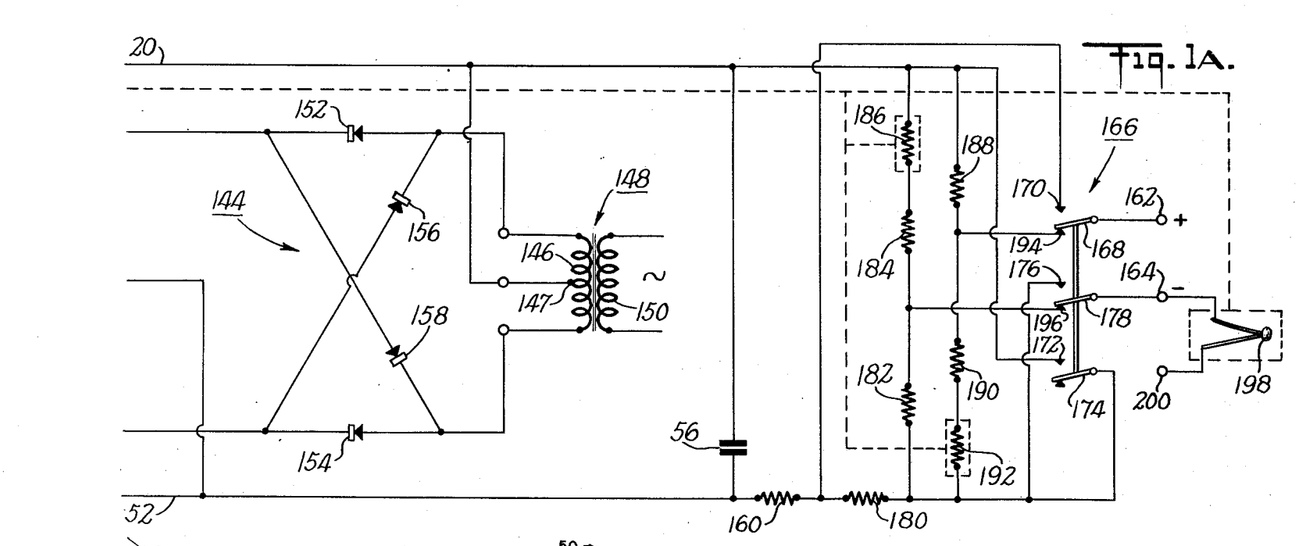

Referring now to Figure 1, there is shown a portion of a stainless steel pipe 2 through which flows a solution 4 whose pH is to be measured. Inserted through an opening in the wall of the pipe 2 are a measurement half cell 8 (which may be a quinhydrone glass electrode), a reference half cell 10 (which may be a calomel cell), and a temperature sensor 12 containing a thermocouple and two sensitive resistive elements (such as the elements commonly known as nickel thermometer bulbs). Connection is made to the measurement half cell terminal 6 through the inner conductor of a coaxial cable 24, the outer conductor of which serves to shield out stray electrical fields. Connection is made to the reference half cell terminal 14 through a conductive lead 20. A third electrical connection is also made to the solution 4 through the pipe 2 and a conductive lead 22 which is returned to a common system ground circuit G.

Because of the electrochemical cell activity, voltages will be developed between the common ground G and each of the half cell terminals 6 and 14. The difference between these two voltages will be equal to the difference in potetnial between the half cell terminals 6 and 14, and this difference in potential, as mentioned hereinabove, is a measure of pH for any given temperature of the test solution 4. Although there is also a voltage developed between the pipe 2 and the solution 4, of variable magnitude depending partly upon the composition of the solution 4, this voltage does not have any substantial effect on the difference in potential referred to above, apparently because it is common to the two voltages developed between ground G and the half cell terminals.

Measurement of the difference in voltage between the common ground G and the half cell terminals 6 and 14 cannot be performed by the usual methods, since the internal cell resistance is too high to allow any appreciable current drain. To avoid excessive current drain, a potential comparison arrangement is employed. For this purpose, there is connected to an input terminal 16 of an amplifier, generally indicated at 17 and enclosed within broken lines in the drawing, the movable arm 32 of a vibrating two-pole switch, generally indicated at 28; the other input terminal 18 of the amplifier 17 is connected to the common ground G. The amplifier 17 can be considered as an impedance converter, since it transforms the extremely high impedance of the measurement cells to a relatively normal output impedance; it can also be considered as a current amplifier, since it supplies considerably more current than can be drawn from the measurement cells.

The movable arm 32 of the vibrating switch 28 is driven, so as to make alternating connection to the two fixed contacts 26 and 30, by the magnetic field of a coil 34 which is connected at two terminals 36 and 38 to a source of power main frequency. The inner conductor of the coaxial cable 24 connects one of the fixed contacts 26 to the measurement half cell terminal 6. The other fixed contact 30 is connected to the outer conductor of the coaxial cable 24 and through a feedback lead 52 and a filter resistor 54 to one plate of an output capacitor 56, which, as will be explained hereinafter, carries a unidirectional potential whose magnitude and polarity is a function of the magnitude and phase of the signal on the input terminals 16 and 18 of the current amplifier 17. The other plate of the output capacitor 56 is returned through a connection lead 20 to the reference half cell terminal 14.

Before proceeding with a detailed explanation of the electronic circuitry, a brief review of the system operation will be presented: The driving coil 34 of the vibrating switch 28 is supplied with alternating current from the usual power mains, and therefore vibrates movable arm 32 into alternating connection with the fixed contacts 26 and 30 at the power main frequency (generally 60 cycles per second). Consequently, when the potential between one fixed contact and ground is different than the potential between the other fixed contact and ground, an alternating signal will be applied to the input terminals 16 and 18 of the amplifier 17. This signal is intensified and subsequently phase-detected by a phase-sensitive rectifier, generally indicated at 144, thereby producing a unidirectional voltage across the output capacitor 56. The magnitude of this latter voltage is proportional to the magnitude of the signal across the current amplifier input terminals 16 and 18, and its polarity is a function of the phase relation between the input signal and a reference signal obtained from the power mains.

If there is a difference in potential between the terminals of the measurement half cell 8 and the reference half cell 10 when the system is placed in operation, this difference will instantaneously appear as an alternating signal on the amplifier input terminals 16 and 18, thereby producing a unidirectional voltage on the output capacitor 56. This latter voltage is effectively in series with the potential produced across the reference half cell terminal 14 and the common ground G, and by virtue of the negative feedback connection through the feedback lead 52, will be of such magnitude and polarity as to reduce the signal on the current amplifier input terminals 16 and 18 to nearly zero. The voltage on the output capacitor 56 is, therefore, a function of the difference between the potentials of the two half cells; and this difference, as explained hereinabove, is a measure of the pH of the solution 4 at a given temperature.

The accuracy with which the voltage on the capacitor 56 represents the difference between the half cell potentials is, of course, dependent upon the gain of the amplifier 17. The direct-current loop gain of the amplifier used in the preferred embodiment is approximately 1300, and it can readily be shown that this will give an accuracy factor of 0.9992, or less than 0.1% error. As a result of the feedback action, the accuracy factor is not critically dependent upon tube characteristics, etc., which might fluctuate with time and ambient conditions. For example, if the amplifier gain decreased by 10% to 1170, the accuracy factor would decrease to only 0.9991, still giving less than 0.1% error.

Because the system compares two potentials which are automatically maintained at nearly equal values, there will be virtually no current drained from the half cells. That is, when the system is in balance, the fixed contacts 26 and 30 are at virtually the same potential, and the D.-C. blocking capacitor 40 in the amplifier input circuit will be charged to substantially this same potential. Consequently, the half cells need only supply the relatively small current required to maintain the capacitor 40 charged to this potential, so that the half cells are in effect alternately connected to a nearly infinite impedance. On the other hand, the voltage which appears across the output capacitor 56 is derived from a very low impedance circuit in the phase-detector 144, and therefore may readily be used to drive a recorder, controller, or similar load device requiring relatively large amounts of electrical energy.

It can be seen that the third connection made to the solution 4 through the pipe 2 effectively minimizes the problems of isolation and insulation. Circulating currents induced by external electric fields or other sources cannot seriously affect the potential measurements made at the input to the current amplifier 17, since there is a low resistance connection between the third electrode (in the preferred embodiment shown, this electrode comprises the pipe 2 through which the solution 4 is flowing) and the grounded input terminal 18 of the current amplifier 17. In those prior art arrangements wherein the amplifier input circuit was "floating" with respect to the solution (that is, where there is no direct-current connection between the amplifier input and the vessel), there was always the possibility that circulating currents could flow through unwanted paths and thereby lead to erroneous input signals and instability. However, in the apparatus embodying the present invention, such circulating currents can have no substantial effect on the amplifier input potentials, since the low resistance ground connection assures that the cathode 50 of the first amplifier tube 46 is always maintained at the potential of the pipe 2.

It should be noted that connection of the outer conductor of the coaxial cable 24 to the lower fixed contact 30 of the switch 28 provides a special advantage in an automatic feedback pH measurement system such as is disclosed herein, by decreasing the response time required after start of a measurement. When the system is placed in operation by immersion of the half cells 8 and 10 into the test solution 4, there will initially be no potential difference between the outer and the inner conductors of the coaxial cable 24. And when the system has reached a stable operating condition, the potential difference between the fixed contacts 26 and 30 will be virtually zero, due to the feedback action, so that in this condition there again will be practically no potential difference between the outer and inner conductors of the coaxial cable 24. Consequently, the connection between the outer conductor and the fixed contact 30 obviates the necessity of charging the inherent capacity of the coaxial cable 24 to some predetermined voltage, and thereby allows the system to reach a stabilized condition very rapidly, effectively limited only by the speed of response of the electronic feedback circuitry. In the apparatus disclosed herein as an embodiment of the present invention, the elapsed time between immersion of half cells 8 and 10 and a steady output voltage is in the order of a few tenths of a second, whereas in certain prior art arrangements this time is in the order of seconds.

It has been found that the material of which the pipe 2 is constructed has some influence on the degree of measurement stability obtainable. In this respect, stainless steel was found to be the most satisfactory of the materials investigated. There is no clear explanation for this dependency, although it may possibly be due to the work function of the material; that is, the inherent reluctance of a conducting material to give up electrons to a surrounding medium, in this case the solution 4. Another possible explanation is that stainless steel is relatively inert, and hence will not readily enter into chemical reactions with the solution under test. Regardless of the reason, the use of stainless steel as a contact electrode in the potential measurement system described herein provides marked advantages over other commonly used electrically conducting materials.

Referring now to the details of the electronic circuitry shown in the drawing, the following description and explanation is presented: The signal appearing on the movable arm 32 of the switch 28 is fed through a blocking capacitor 40 and a current limiting resistor 42 to the control grid 44 of a pentode vacuum tube generally indicated at 46. This tube 46, which may be any of the usual pentode types but preferably is one having a relatively high input impedance (such as the commercial type 954) comprises the first stage of a four-stage amplifier generally indicated at 17. To provide a path for the return of current flowing from the cathode 50 to the control grid 44 of this tube 46, a resistor 48 of relatively high ohmic value is connected between the common ground G and the junction of the blocking capacitor 40 and the current limiting resistor 42. The cathode 50 is connected to the common ground G, and a filter comprising a capacitor 53 and a resistor 54 is connected between ground and the feedback lead 52, to filter out voltage fluctuations in the feedback circuit which is connected to the fixed contact 30 of the vibrating switch 28.

When the movable arm 32 makes connection with the upper fixed contact 26 (as viewed in the drawing), the input voltage to the amplifier 17 can be traced by following the inner conductor of the coaxial cable 24 back to the terminal 6 of the measurement half cell 8, from there to the solution 4, thence to the pipe 2 and back to the common ground G. Thus, when the switch 28 is in this position, the voltage across the current amplifier input terminals 16 and 18 is the sum of the potential generated by the measurement half cell 8 and the potential developed across the junction of the solution 4 and the pipe 2.

When the movable arm 32 makes connection to the other fixed contact 30, the voltage across the current amplifier input terminals 16 and 18 can be determined by tracing the feedback lead 52 through the filter resistor 54 to one plate of the output capacitor 56, from the other plate of this capacitor 56 along the connection lead 20 to the terminal 14 of the reference half cell 10, through the solution 4 to the pipe 2 and back to the common ground G. Thus, when the switch 28 is in this position, the input voltage to the current amplifier 17 is the sum of the potential developed across the reference half cell 10, the potential developed by the junction between the solution 4 and the pipe 2, and the unidirectional output voltage appearing across the output capacitor 56.

Returning now to the first amplifier tube 46, the suppressor grid 58 is connected to the cathode 50 in the usual manner, and the screen grid 60 is connected through two dropping resistors 62 and 64 to a high-voltage lead 66 which carries positive direct-current voltage obtained from the positive terminal 65 of a regulated power supply 67, which is fed from the usual power mains and has a negative terminal 69 connected to the common ground G. Two filter capacitors 68 and 70 are connected between opposite ends of the dropping resistor 62 and ground G, to by-pass any current fluctuations. The plate 72 of this first amplifier tube 46 is connected through two dropping resistors 74 and 64 to the high-voltage lead 66 to give the plate 72 the proper positive potential with respect to the cathode 50, and is also coupled through a coupling capacitor 76 to the control grid 78 of another pentode amplifier tube generally indicated at 80.

The second pentode 80 is connected substantially in the same manner as the previous amplifier tube 46. A current return resistor 82 is bridged between the control grid 78 and ground G, the suppressor grid 84 is connected to the cathode 86, and the screen grid 88 is connected through two dropping resistors 90 and 92 to the high-voltage lead 66 with two filter capacitors 94 and 96 connected between opposite ends of the dropping resistor 90 and ground G. In addition, a relatively small feedback resistor 98 is inserted between ground and the cathode 86 to provide degeneration in the amplifier stage and thereby improve its stability.

The plate 100 of this tube 80 is connected through two dropping resistors 102 and 92 to the high-voltage lead 66 in the usual manner, and is also coupled through a coupling capacitor 104 to the control grid 106 of a triode amplifier tube generally indicated at 108. As with the previous amplifier stage, a current return resistor 110 is bridged between the control grid 106 and ground G, and a feedback resistor 112 is inserted between the cathode 114 and ground to improve stability by degeneration. Additional degenerative feedback is provided through a coupling capacitor 116 connected between the plate 118 and control grid 106, for the purpose of reducing the amplifier response to relatively high frequencies.

The plate 118 of this latter triode tube 108 is also connected through a dropping resistor 120 to the high-voltage lead 66, in the usual manner, and the output signal appearing on its plate 118 is fed through a coupling capacitor 122 to the control grid 124 of the final amplifier tube, generally indicated at 126. As in the previous stage of amplification, a current return resistor 128 is bridged across the control grid 124 and the common ground circuit, and a feedback resistor 130 is connected between the cathode 132 and ground to produce degeneration for improved stability. The output signal appearing on the plate 134, however, is fed to one terminal of the primary winding 136 of an audio transformer, generally indicated at 138. The other terminal of the primary winding 136 is returned to the high-voltage lead 66 to provide operating potential for the plate 134, and a phase-correcting capacitor 140 is bridged across the primary winding 136 to assure that the amplifier output signal is of the correct phase for the phase-sensitive detection circuit, to be described hereinbelow, and to provide further reduction of amplifier response to high frequencies.

Although a detailed description of one suitable current amplifier has been given hereinabove, it is desired to emphasize that the invention is not limited thereby. Any amplifier configuration with appropriate gain and impedance characteristics will, of course, serve satisfactorily in this function.

The amplifier 17, described above, produces an output signal on the secondary winding 142 of the audio transformer 138, and to detect this signal a phase-sensitive detector or rectifier generally indicated at 144 is provided. This detector produces a direct-current voltage across the output capacitor 56 and a network of load resistors, which are effectively bridged from the center tap 143 of the secondary winding 142 to the center tap 147 of a reference voltage winding 146 of a power transformer generally indicated at 148, and whose primary winding 150 is connected to the usual power mains. The phase-sensitive detector comprises four half-wave rectifiers, of which two are straight-connected between corresponding end terminals of the secondary winding 142 and the reference winding 146, and the other two are cross-connected between oppositely corresponding end terminals of these two windings. For proper operation of the phase-sensitive detector 144, it is necessary that the voltage amplitude on the reference winding 146 have a greater magnitude than the signal amplitude on the secondary winding 142.

In operation, if the voltages on the secondary winding 142 and the reference winding 146 are in phase (that is, when the potentials on the upper terminals of the secondary winding 142 and the reference winding 146 go positive at the same times), during the half cycle when the potential on the upper terminal of the secondary winding 142 is positive with respect to the potential on the lower terminal of this winding, current will flow through the following paths: (1) from the upper terminal of the secondary winding 142 through the cross-connected rectifier 158, across the lower half of the reference winding 146, through the resistive load network connected across the output capacitor 56, to the center tap of the secondary winding 142, and back across the upper half of that latter winding 142, and (2) from the upper terminal of the reference winding through the straight-connected rectifier 152, across the upper half of the secondary winding 142, through the resistive load network connected across the output capacitor 56, and back across the upper half of the reference winding 146. It can readily be seen that the total potential around the loop of path (1) above is one half the sum of the voltages on the reference winding 146 and the secondary winding 142, and that the total potential around the loop of the path (2) above is one half of the difference of these voltages. And, since the direction of current for these two paths, with regard to the output capacitor 56, is opposite, the net amount of current flowing into the output capacitor will be proportional to the magnitude of the voltage on the secondary winding 142.

During the succeeding half cycle, it will be observed that the current paths will flow through the other rectifiers 154 and 156, and that the net current flowing into the output capacitor 56 will be in the same direction as the net current flowing during the previous half cycle. Consequently, the phase-sensitive rectifier 144 serves as a full-wave detector, passing signal current during each half cycle, and producing a unidirectional voltage across the output capacitor 56 having a magnitude proportional to the amplitude of the signal voltage on the secondary winding 142. When the voltages on the secondary winding 142 and the reference winding 146 are out of phase, it can readily be determined that current will flow through the same paths outlined above for the in-phase condition; however, in the out-of-phase condition, the net current flowing through the resistive load network connected across the output capacitor 56 will be in a different direction than the net current flowing during the in-phase condition. Consequently, the polarity of the unidirectional voltage appearing across the output capacitor 56 will be a function of the phase of the signal fed to the current amplifier input terminals 16 and 18.

When the measurement system is in operation, there will be across the output capacitor 56 a voltage which is a function of the pH of the solution 4. This voltage is not compensated for the temperature of the solution 4; that is, if there is any appreciable deviation in the temperature of the solution 4, there will be a corresponding deviation in the magnitude of the voltage on the output capacitor 56. For some applications, it is not necessary to compensate for such temperature deviations, and accordingly provision is made for connecting this output signal through a padding resistor 160 directly to the output terminals 162 and 164. Such connection is made when the output switch, a double-throw, three pole device generally indicated at 166, is switched to its upper position (opposite to that shown in the drawing). In this condition, the output circuit can be traced from one output terminal 162 to a movable arm 168, through one fixed contact 170 and a padding resistor 160, across the output capacitor 56, back to another fixed contact 172 of the switch 166, through another movable arm 174 to another fixed contact 176, and returns through yet another movable arm 178 to the other output terminal 164.

However, when temperature compensation is required, the switch 166 is placed in its lower position (as shown in the drawing). In this condition, there is connected across the output capacitor 56 a network comprising the padding resistor 160 in series with a dropping resistor 180 and a bridge including six resistors 182, 184, 186, 188, 190 and 192. Two of these resistors 186 and 192 are temperature sensitive devices, commonly known as resistance thermometer bulbs, are physically located within the temperature sensor 12, and are immersed (as indicated by the surrounding dotted lines and the broken line leading to the temperature sensor 12) in the solution 4 along with the measurement half cell 8 and the reference half cell 10. Output connections from the compensating bridge network can be traced from the junction of the two bridge resistors 188 and 190 through a fixed contact 194 and a movable arm 168 of the output switch 166 to one output terminal 162, and from the junction of two other bridge resistors 182 and 184 through a fixed contact 196 and a movable arm 178 of the switch 166 to the other output terminal 164.

By choosing the bridge resistors such that the ohmic resistances of corresponding elements are equal (that is, using the designations shown in the drawing, resistor 184 is equal to resistor 190, resistor 182 is equal to resistor 188, and resistor 186 is equal to resistor 192) at the same temperature, it can readily be shown that the voltage on the output terminals 162 and 164 is related to the voltage across the output capacitor 56 by a proportionality factor which is a linear function of the ohmic resistance of the two temperature sensitive resistors 186 and 192, and hence essentially a linear function of temperature (over the usual ranges of interest). This correction factor will be dependent upon the ohmic values of all the resistors in the network, including the padding resistor 160 and the dropping resistor 180. Proper choice of these resistors will result in a slope compensation which effectively nullifies the influence that the temperature of the solution 4 has on the relation between the pH of the solution 4 and the voltage across the output capacitor 56, since as mentioned previously that relation is also essentially a linear function of pH.

Figure 2:
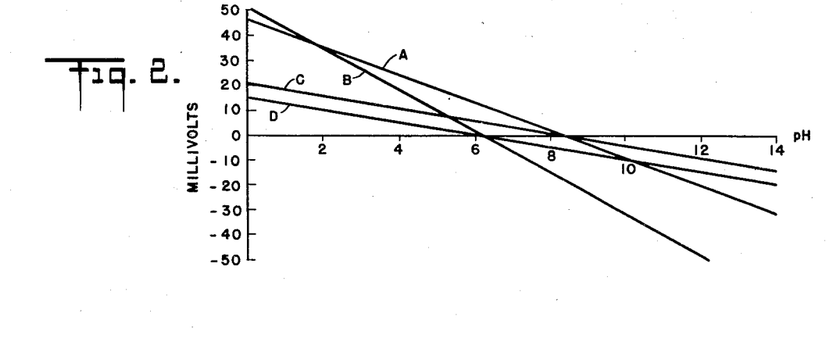
Figure 2 is a graph showing output voltage versus solution pH for various temperatures.

Figure 2 shows graphically the nature of this compensation and its effect on the temperature characteristics of the measurement system. In this figure, which is a plot of output voltage versus solution pH, line A represents uncompensated voltages measured between two switch terminals 170 and 172 at a solution temperature of zero degrees centigrade. Line B represents a similar measurement of uncompensated voltages at a solution temperature of 100 degrees centigrade. It should be noted that a variation in temperature has the effect of altering the slope of the voltage characteristic for various values of solution pH, and at the same time shifts the zero voltage intercept (i. e., the pH at which the measurement system produces a zero voltage output).

Lines C and D in Figure 2 represent voltages measured between switch terminals 194 and 196 for various values of solution pH, the measurement of line C having been made at a solution temperature of zero degree centigrade and that of line D at 100 degrees centigrade. The compensation effect of the bridge network which includes the two temperature sensitive resistors 186 and 192 can be clearly seen. The compensated output voltage lines remain substantially parallel, even over a range of 100 degrees centigrade, so that the incremental change in voltage for a given change in pH will remain constant independent of changes in solution temperature. This latter characteristic is, of course, a requirement for effective use with automatic pH control equipment.

The modern glass electrode, which is used as the measurement electrode in many applications, does not display a zero-voltage intercept shift such as is shown on Figure 2. That is, when such electrodes are employed in the measurement system, a change in solution temperature will alter the slope of the characteristic output voltage line, but the line, in effect, merely rotates about the zero voltage intersection. Therefore, the bridge network compensation arrangement, described above, is adequate by itself to correct for the effects of temperature on a glass electrode.

For many types of measurement half cells, however, the temperature of the solution under test affects not only the slope of the output voltage characteristic, but also shifts the zero voltage intercept of this characteristic, as shown in Figure 2. In these situations, a slope correction is insufficient, and additional compensation must be provided.

It has been found that this can be done by connecting to one of the output terminals, for example the output terminal designated in the drawing as 164, one lead of a thermocouple element 198 (such as one having an iron-constantan junction), and connecting the other lead of the thermocouple to an alternate output terminal 200 which can be connected to the input of a load device such as a recorder, controller, etc. (not shown). The junction bead of the thermocouple 198 is physically located in the temperature sensor 12, and is immersed in the solution 4, along with the other sensing elements 8 and 10. The potential produced as a result of the temperature difference between ambient conditions at the measuring equipment (or in a constant temperature chamber provided for the purpose) and the solution 4 can be used to nullify the zero voltage intercept shift mentioned above.

When thermocouple compensation is employed, it is necessary to match the resistive output network to the thermocouple characteristics, since the thermocouple element produces a fixed potential for any given temperature difference. Matching can readily be accomplished by adjusting the padding resistor 160 and the dropping resistor 180 in relation to the other resistors in the bridge network, so that the combination of resistors will provide a proper degree of attenuation and produce the correct slope of lines C and D in Figure 2. The correct slope is attained when, at any given pH, the displacement between lines C and D in millivolts is exactly equal to the change in thermocouple potential over the same temperature range.

For example, in Figure 2 line D intersects the zero millivolt axis at a pH of about 6, for measurements made at 100 degrees centigrade. At a temperature of zero degree centigrade, line C shows that a solution of pH 6 would produce an output voltage of about five millivolts. If the thermocouple 198 produced a corresponding potential change of about five millivolts over this temperature range of 100 degrees, and of opposite polarity, the resultant compensated output would be independent of temperature. That is, the shift in millivolts from line B to line C would be nullified by the change in potential of the thermocouple element 198.

When full compensation is employed, the measuring system provides an output voltage characteristic that is substantially linear with respect to pH, and is independent of the temperature of the solution 4. Consequently, the measuring system may readily be used in conjunction with automatic control equipment whose function is to maintain the solution pH at a desired level, since such control equipment can operate satisfactorily only from measurement signals that are solely representative of pH.

From the foregoing, it will be observed that the pH measuring apparatus embodying the invention is well adapted for attainment of the objects and purposes set forth hereinabove. It is apparent that the various features may be modified in order to adapt the apparatus to particular use and that one or more of the features may be used without a corresponding use of other features. It should be understood that the foregoing example is given for the purpose of illustrating a preferred embodiment of the invention and not for the purposes of limitation except as set forth in the following claims or required by the prior art.

We claim:

1. In a pH measuring system, the combination of first and second half cells adaptable for immersion in a test solution, a contact electrode for making electrical connection to said test solution, an amplifier having input and output circuits, each of said circuits including first and second terminals, said first output circuit terminal being connected to said first half cell, switch means for alternately connecting said first input circuit terminal to said second half cell and to said second output circuit terminal, and means for connecting said contact electrode to said second input circuit terminal.

2. In a pH measuring system, the combination of first and second half cells adaptable for immersion in a test solution, a metallic pipe for carrying said test solution, a current amplifier having input and output circuits, each of said circuits including first and second terminals, said first output circuit terminal being connected to said first half cell, switch means for alternately connecting said first input circuit terminal to said second half cell and to said second output circuit terminal, and means for connecting said metallic pipe to said second input circuit terminal.

3. In a pH measuring system, the combination of first and second half cells adaptable for immersion in a test solution whose pH is to be determined, a metallic contact electrode for making electrical connection to said test solution, an amplifier having first and second input terminals and first and second output terminals, said first output terminal being connected to said first half cell, switch means for alternately connecting said first input terminal to said second half cell and to said second output terminal, and means for connecting said metallic contact electrode to said second input terminal.

4. In a pH measuring system, the combination of first and second half cells adaptable for immersion in a test solution whose pH is to be determined, a metallic pipe through which said test solution is flowable, an amplifier having first and second input terminals and first and second output terminals, said first output terminal being connected to said first half cell, switch means for alternately connecting said first input terminal to said second half cell and to said second output terminal, and means for connecting said metallic pipe to said second input terminal.

5. In a pH measuring system, the combination of a measurement half cell and a reference half cell adaptable for immersion in a test solution whose pH is to be determined, a stainless steel contact electrode for making electrical connection to said test solution, amplification means having input and output circuits, each of said circuits including first and second terminals, said first output circuit terminal being connected to said reference half cell, switch means for alternately connecting said first input circuit terminal to said second measurement half cell and to said output circuit terminal, and means for connecting said stainless steel contact electrode to said second input circuit terminal.

6. In a pH measuring system, the combination of a measurement half cell and a reference half cell for immersion in a solution whose pH is to be determined, a stainless steel pipe for carrying said solution, amplification means having input and output circuits, each of said circuits including first and second terminals, said first output circuit terminal being connected to said reference half cell, switch means for alternately connecting said first input circuit terminal to said measurement half cell and to said second output circuit terminal, and means for connecting said stainless steel pipe to said second input circuit terminal.

7. In a system for measuring the concentration of hydrogen ions in a solution, the combination of a first half cell adaptable for immersion in said solution for developing a potential responsive to the concentration of hydrogen ions therein, a second half cell adaptable for immersion in said solution for developing a potential substantially non-responsive to the concentration of hydrogen ions therein, an electrically conductive hollow container for holding said solution and adapted to receive said half cells, a current amplifier having first and second input terminals and first and second output terminals, said first output terminal being connected to said second half cell and said second input terminal being connected to said container, alternating switch means for connecting said first input terminal of said current amplifier successively to said first half cell and said second output terminal, and means for driving said alternating switch means.

8. In a system for measuring the concentration of hydrogen ions in a solution, the combination of a first half cell adaptable for immersion in said solution for developing a potential responsive to the concentration of hydrogen ions therein, a second half cell adaptable for immersion in said solution for developing a potential substantially non-responsive to the concentration of hydrogen ions therein, a stainless steel container for holding said solution and adapted to receive said half cells, an amplifier having first and second input terminals and first and second output terminals, said first output terminal being connected to said second half cell and said second input terminal being connected to said container, alternating switch means for connecting said first input terminal circuit of said amplifier successively to said first half cell and said second output terminal, and means for driving said alternating switch means at a substantially constant predetermined rate.

9. In a system for measuring the concentration of hydrogen ions in a test solution, the combination of a measurement half cell for developing a potential responsive to the concentration of hydrogen ions when immersed in said test solution, a reference half cell for developing a potential substantially non-responsive to the concentration of hydrogen ions when immersed in said test solution, a stainless steel vessel for holding said test solution and adapted to receive said half cells, a current amplifier having first and second input terminals and first and second output terminals, said first output terminal being connected to said reference half cell, and said second input terminal being connected to said vessel, alternating switch means for connecting said first input terminal of said current amplifier successively to said second measurement half cell and said output terminal, and means for driving said alternating switch means.

10. In a system for measuring the concentration of hydrogen ions in a test solution, the combination of a glass electrode for developing a potential responsive to the concentration of hydrogen ions when immersed in said test solution, a calomel half cell for developing a potential substantially non-responsive to the concentration of hydrogen ions when immersed in said test solution, a stainless steel vessel for holding said test solution and adapted to receive said glass electrode and said half cell, an amplifier having first and second input terminals and first and second output terminals, said first output terminal being connected to said reference half cell, and said second input terminal being connected to said vessel, alternating switch means for connecting said first input circuit of said amplifier successively to said glass electrode and to said second output terminal, and means for driving said alternating switch means.

11. In a pH measuring system, the combination of first and second half cells and a metallic electrode for forming an electrochemical cell when placed in contact with a test solution whose pH is to be determined, an amplifier having first and second input terminals and an output circuit, detection means connected to said output circuit and having first and second output terminals, a load impedance connected to said output terminals, switch means for alternately connecting said first input terminal to said first half cell and to said second output terminal, means for connecting said second input terminal to said metallic electrode, and means for connecting said first output terminal to said second half cell.

12. In a pH measuring system, the combination of first and second half cells immersible in a test solution whose pH is to be determined, a metallic pipe for carrying said test solution, a current amplifier having first and second input terminals and an output circuit, said second input terminal being connected to said metallic pipe, detection means connected to said output circuit and having first and second output terminals, said first output terminal being connected to said second half cell, switch means for alternately connecting said first input terminal to said first half cell and to said second output terminal.

13. In a pH measuring system, the combination of a current amplifier having first and second input terminals and an output circuit, a phase-sensitive detector connected to said current amplifier output circuit and having first and second output terminals, a load impedance connected to said output terminals, switch means for alternately connecting said first current amplifier input terminal to a first half cell immersed in a solution whose pH is to be measured and to said second detector output terminal, means for connecting said second current amplifier input terminal to a metallic electrode in contact with said solution, and means for connecting said first detector output terminal to a second half cell immersed in said solution.

14. In a pH measuring system, the combination of a current amplifier having first and second input terminals and an output circuit, said second input terminal being connected to a metallic electrode in contact with a solution whose pH is to be determined, a phase-sensitive detector connected to said current amplifier output circuit and having first and second output terminals, said first output terminal being connected to a reference half cell immersible in said solution, and switch means for alternately connecting said first current amplifier input terminal to a measurement half cell immersible in said solution and to said second detector output terminal.

15. In a pH measuring system, the combination of first and second half cells adaptable for immersion in a solution whose pH is to be determined, a metallic vessel for containing said solution and adapted for receiving said first and second half cells, a current amplifier having input and output circuits, said input circuit being connected to said metallic vessel, vibratory switch means having first and second fixed contacts and a movable arm, said movable arm being connected to said current amplifier input circuit, a phase-sensitive detector connected to said current amplifier output circuit and having first and second output terminals, said second output terminal being connected to said second fixed contact, a coaxial cable having inner and outer conductors, said inner conductor being connected between said first half cell and said first fixed contact and said outer conductor being connected to said second fixed contact, and means connecting said first detector output terminal to said second half cell.

16. In a pH measuring system, the combination of first and second half cells adaptable for immersion in a solution whose pH is to be determined, a metallic vessel for containing said solution and adapted for receiving said first and second half cells, an amplifier having input and output circuits each including first and second terminals, said second input circuit terminal being connected to said metallic vessel, vibratory switch means having first and second fixed contacts and a movable arm, said movable arm being connected to said first amplifier input terminal circuit and said first fixed contact being connected to said first half cell, and a phase-sensitive detector connected to said amplifier output circuit terminals, and having first and second output terminals, said first detector output terminal being connected to said second detector half cell and said second output terminal being connected to said second fixed contact.

17. In a pH measuring system, the combination of first and second half cells adaptable for immersion in a test solution, a stainless steel vessel for containing said test solution, a temperature sensor adaptable for immersion in said test solution and including two temperature-sensitive resistor elements, a current amplifier having input and output circuits each including first and second terminals, said first output circuit terminal being connected to said first half cell and said second input circuit terminal being connected to said vessel, oscillating switch means for alternately connecting said first input circuit terminal to said second half cell and to said second output circuit terminal, a temperature-compensating bridge connected to said output circuit and to said temperature sensor, said bridge comprising a plurality of resistors, and an output circuit for said bridge.

18. In a pH measuring system, the combination of first and second half cells adaptable for immersion in a test solution, a metallic pipe for containing said test solution, a temperature sensor adaptable for immersion in said test solution and including two nickel thermometer bulbs, an amplifier having input and output circuits each including first and second terminals, said first output circuit terminal being connected to said first half cell and said second input circuit terminal being connected to said vessel, oscillating switch means for alternately connecting said first input circuit terminal to said second half cell and to said second output circuit terminal, a temperature-compensating network connected to said output circuit, said network having a resistance bridge including said two nickel thermometer bulbs, and an output circuit for said network.

19. A pH measuring system comprising, in combination, a stainless steel pipe for carrying a solution whose pH is to be determined, first and second electrochemical half cells adaptable for insertion into said stainless steel pipe for immersion in said solution, a temperature sensor adaptable for insertion into said stainless steel pipe for immersion in said solution and including at least two temperature-sensitive resistor elements and a thermocouple bead, a current amplifier having input and output circuits each including first and second terminals, said input circuit including a blocking capacitor and said second input terminal being connected to said stainless steel pipe, a phase-sensitive rectifier connected to said current amplifier output circuit and having an output load circuit including first and second terminals said first rectifier output terminal being connected to said second electrochemical half cell, switch means including a movable arm and first and second fixed contacts, said movable arm being connected to said first current amplifier input terminal, an inductive winding magnetically associated with said movable arm for driving said arm in a vibratory manner, a coaxial cable having inner and outer conductors, said inner conductor being connected between said first electrochemical half cell and said first fixed contact and said outer conductor being connected to said second fixed contact, feedback means coupling said rectifier second output load circuit terminal to said second fixed contact, and a temperature compensating network connected to said rectifier output load circuit and including said temperature-sensitive resistors and said thermocouple bead.

20. A pH measuring system comprising, in combination, a stainless steel pipe for carrying a solution whose pH is to be determined, a glass electrode and a reference half cell adaptable for insertion into said stainless steel pipe for immersion in said solution, a temperature sensor adaptable for insertion into said stainless steel pipe for immersion in said solution and including two temperature-sensitive resistor elements and a thermocouple bead, a current amplifier having input and output circuits each including first and second terminals, said input circuit including a blocking capacitor and said second input terminal being connected to said stainless steel pipe, a phase-sensitive rectifier connected to said current amplifier output circuit and having an output load circuit including first and second terminals, said first rectifier output terminal being connected to said reference half cell, switch means comprising a movable arm and first and second fixed contacts, said movable arm being connected to said first current amplifier input terminal circuit, an inductive winding magnetically associated with said movable arm for driving said arm in a vibratory manner, a coaxial cable having inner and outer conductors, said inner conductor being connected between said glass electrode and said first fixed contact and said outer conductor being connected to said second fixed contact, feedback means coupling said second rectifier output load circuit terminal to said second fixed contact, and a temperature compensating network connected to said rectifier output load circuit and including said temperature-sensitive resistors and said thermocouple bead.

21. In a pH measuring system, the combination of first, second and third electrodes for making electrical connection to a solution whose pH is to be determined, a current amplifier having input and output circuits, switch means connected to said input circuit and having first and second positions, whereby in said first position said input circuit is coupled to said first and second electrodes and in said second position said input circuit is coupled to said first and third electrodes, feedback means coupling said output circuit to said input circuit when said switch means is in said second position, whereby the potential applied to said input circuit when said switch means is in said first position is maintained substantially equal to the potential applied to said input circuit when said switch means is in said second position.

22. In a pH measuring system, the combination of first, second and third electrodes for making electrical connection to a solution whose pH is to be determined, a current amplifier having input and output circuits, switch means connected to said input circuit and having first and and second positions, said input circuit being coupled to said first and second electrodes in said first position and to said first and third electrodes in said second position, feedback means coupling said output circuit to said input circuit when said switch means is in said second position, whereby the potential applied to said input circuit when said switch means is in said first position is caused to be substantially equal to the potential applied to said input circuit when said switch means is in said second position.

23. In a pH measuring system, the combination of an electrically conductive vessel for containing a solution whose pH is to be determined, first and second electrodes adaptable for immersion in said solution, a current amplifier having input and output circuits, each including first and second terminals alternating switch means connected to said first current amplifier input circuit terminal and having first and second positions, whereby in said first position said input circuit terminals are connected to said first electrode and said vessel and in said second position said input circuit terminals are connected to said second output circuit terminal and said vessel, and means connecting said first output circuit terminal to said second electrode.

24. In a pH measuring system, the combination of an electrically conductive vessel for containing a solution whose pH is to be determined, measurement and reference half cells adaptable for immersion in said solution, a current amplifier having input and output circuits each including first and second terminals, said first output circuit terminal being connected to said reference half cell, and alternating switch means connected to said first current amplifier input circuit terminals and having first and second positions, said input circuit being coupled to said measurement half cell and said vessel in said first position and to said second output circuit terminal and said vessel in said second position.

25. In a pH measuring system, the combination of first and second half cells adaptable for immersion in a test solution, a contact electrode for making electrical connection to said test solution, a current amplifier having first and second input circuit terminals and first and second output terminals, said second input circuit terminal being connected to said contact electrode, a phase-sensitive detector connected to said current amplifier and including first and second non-linear circuit elements each connected between one of said current amplifier output terminals and a corresponding terminal of a source of reference voltage, said detector also including third and fourth non-linear circuit elements each connected between one of said amplifier output terminals and an oppositely corresponding terminal of said reference voltage source, an output circuit for said phase-sensitive detector, including first and second terminals, said first output circuit terminal being connected to said first half cell, and switch means for alternately coupling said first input circuit terminal to said second half cell and to said second detector output circuit terminal.

26. For use with a pH measuring system adapted to produce an electrical signal responsive to the pH of a solution under test, a temperature compensating network connectible to the output circuit of said pH measuring system and comprising, in combination, a resistance bridge having a plurality of resistors including at least two temperature-sensitive resistance bulbs immersible in said solution, at least one dropping resistor connected in series with said bridge for matching the attenuation characteristics of said network to the temperature response characteristics of said pH measuring system, and an output circuit for said network.

27. For use with a pH measuring system adapted to produce an electrical signal responsive to the pH of a solution under test, a temperature compensating network connectible to the output circuit of said pH measuring system and comprising, in combination, a resistance bridge consisting of first and second arms connected in parallel, each of said arms containing a plurality of series-connected resistors including at least one temperature-sensitive resistance bulb adapted for immersion in said solution, at least one dropping resistor connected in series with said bridge for matching the attenuation characteristics of said network to the temperature response characteristics of said pH measuring system, and an output circuit for said network.

28. For use with a pH measuring system adapted to produce an electrical signal responsive to the pH of a solution under test, a temperature compensating network connectible to the output circuit of said pH measuring system and comprising, in combination, a resistance bridge consisting of two arms connected in parallel, each of said arms containing first and second resistors in series with a temperature-sensitive resistance bulb adapted for immersion in said solution, said resistance bulbs having substantially equal ohmic resistances at the same temperature and said first and second resistors in one of said arms each having an ohmic resistance substantially equal to that of said corresponding first and second resistors in said second arm, at least one dropping resistor connected in series with said bridge for matching the attenuation characteristics of said network to the temperature response characteristics of said pH measuring system, and an output circuit for said network connected to the respective junctions of said first and second resistors in each of said arms.

29. For use with a pH measuring system adapted to produce an electrical signal responsive to the pH of a solution under test, a temperature compensating network connectible to the output circuit of said pH measuring system and comprising, in combination, a resistance bridge having a plurality of resistors including at least two temperature-sensitive resistance bulbs immersible in said solution, at least one dropping resistor connected in series with said bridge for matching the attenuation characteristics of said network to the temperature response characteristics of said pH measuring system, a thermocouple having a junction adaptable for immersion in said solution connected to said bridge, and an output circuit for said network and connected to said thermocouple.

30. For use with a pH measuring system adapted to produce an electrical signal responsive to the pH of a solution under test, a temperature compensating network connectible to the output circuit of said pH measuring system and comprising, in combination, a resistance bridge having a plurality of resistors including at least two temperature-sensitive resistance bulbs immersible in said solution, at least one dropping resistor connected in series with said bridge for matching the attenuation characteristics of said network to the temperature response characteristics of said pH measuring system, an iron-constantan thermocouple having a junction adaptable for immersion in said solution connected to said bridge, and an output circuit for said network and connected to said iron-constantan thermocouple.

31. For use with a pH measuring system adapted to produce an electrical signal responsive to the pH of a solution under test, a temperature compensating network connectible to the output circuit of said pH measuring system and comprising, in combination, a resistance bridge consisting of first and second arms connected in parallel, each of said arms containing a plurality of series connected resistors including at least one temperature-sensitive resistance bulb adapted for immersion in said solution, at least one dropping resistor connected in series with said bridge for matching the attenuation characteristics of said network to the temperature response characteristics of said pH measuring system, a thermocouple having a junction adaptable for immersion in said solution connected to said bridge, and an output circuit for said network and connected to said thermocouple.

32. For use with a pH measuring system adapted to produce an electrical signal responsive to the pH of a solution under test, a temperature compensating network connectible to the output circuit of said pH measuring system and comprising, in combination, a resistance bridge consisting of first and second arms connected in parallel, each of said arms containing a plurality of series connected resistors including at least one temperature-sensitive resistance bulb adapted for immersion in said solution, at least one dropping resistor connected in series with said bridge for matching the attenuation characteristics of said network to the temperature response characteristics of said pH measuring system, an iron-constantan thermocouple having a junction adaptable for immersion in said solution connected to said bridge, and an output circuit for said network and connected to said iron-constantan thermocouple.

33. For use with a pH measuring system adapted to produce an electrical signal responsive to the pH of a solution under test, a temperature compensating network connectible to the output circuit of said pH measuring system and comprising, in combination, a resistance bridge consisting of two arms connected in parallel, each of said arms containing first and second resistors in series with a temperature-sensitive resistance bulb adapted for immersion in said solution, said resistance bulbs having substantially equal ohmic resistances at the same temperature and said first and second resistors in one of said arms each having an ohmic resistance substantially equal to that of said corresponding first and second resistors in said second arm, at least one dropping resistor connected in series with said bridge for matching the attenuation characteristics of said network to the temperature response characteristics of said pH measuring system, a thermocouple having a junction adaptable for immersion in said solution connected to said bridge, and an output circuit for said network and connected to said thermocouple.

34. For use with a pH measuring system adapted to produce an electrical signal responsive to the pH of a solution under test, a temperature compensating network connectible to the output circuit of said pH measuring system and comprising, in combination, a resistance bridge consisting of two arms connected in parallel, each of said arms containing first and second resistors in series with a temperature-sensitive resistance bulb adapted for immersion in said solution, said resistance bulbs having substantially equal ohmic resistances at the same temperature and said first and second resistors in one of said arms each having an ohmic resistance substantially equal to that of said corresponding first and second resistors in said second arm, at least one dropping resistor connected in series with said bridge for matching the attenuation characteristics of said network to the temperature response characteristics of said pH measuring system, an iron-constantan thermocouple having a junction adaptable for immersion in said solution connected to said bridge, and an output circuit for said network and connected to said iron-constantan thermocouple.

References Cited in the file of this patent

UNITED STATES PATENTS

| | | |
|---|---|---|
| 1,870,982 | Behr | Aug. 9, 1932 |
| 1,870,995 | Greer | Aug. 9, 1932 |
| 2,232,211 | Cary | Feb. 18, 1941 |
| 2,288,180 | Brengman et al. | June 30, 1942 |
| 2,383,145 | Coleman | Aug. 28, 1945 |